Nov. 4, 1969 K. RUDZITIS ET AL 3,476,475
FILM STRIP ADAPTER
Filed Aug. 14, 1967 2 Sheets-Sheet 1

INVENTORS
KARL RUDZITIS
JOHN CASTELLANO
RUDOLPH G. WOLZ

United States Patent Office 3,476,475
Patented Nov. 4, 1969

3,476,475
FILM STRIP ADAPTER
Karl Rudzitis, Babylon, John Castellano, Commack, and Rudolph G. Wolz, Lake Ronkonkama, N.Y., assignors to Viewlex, Inc., Holbrook, N.Y.
Continuation-in-part of application Ser. No. 489,644, Sept. 23, 1965. This application Aug. 14, 1967, Ser. No. 660,412
Int. Cl. G03b 1/00
U.S. Cl. 353—120                             2 Claims

ABSTRACT OF THE DISCLOSURE

An automatic threading strip film adapter and film cartridge comprising a body member having a film viewing portion and a hollow film feeding portion. A sprocket is rotatably mounted in said body member and a film holding means is pivotally mounted in said film feeding portion of said body member to hold a film roll in contact with said sprocket. The film holding means is spring loaded to press said film roll against said sprocket.

---

This application is a continuation in part of prior application Ser. No. 489,644 filed Sept. 23, 1965.

This invention relates to film strip feeding means and more particularly to self threading film roll adapters for use in slide projectors.

Strip film is commonly used for educational and other purposes and comes in rolls about ten feet long. These rolls are somewhat difficult to handle since they are so short that they are not adapted to be placed in reels as with longer film. Therefore, they are subject to much handling with the danger of finger marks and other damage.

The present invention provides an adapter in which a roll of strip film, for instance ten feet long, may be inserted. The adapter is self threading and feeds the film past a viewing position. After viewing the film is rewound.

More specifically the invention comprises a body member having a film viewing portion and a hollow film feeding portion, said film viewing portion being adapted to be inserted in a slide projector, a sprocket rotatably mounted in said body member, film holding means pivotally mounted in said film feeding portion of said body member and adapted to receive said film roll, means to spring load said film holding means to press said film roll against said sprocket, guide means adapted to guide said film into engagement with said sprocket and into said viewing portion, said sprocket engages said film roll to rotate said film roll so that the leading end of said film is pulled by said sprocket, and stripper means mounted about said sprocket to separate said leading end from said roll.

The invention also incorporates an optional removable strip film cartridge which has a large aperature on one side which is adapted to slip into the film holding means of the film adapter. When using the film cartridge, the film is not touched by the hands at all. The cartridge is merely slid into the adapter and the sprocket is turned for self threading. The sprocket feeds the film into the viewing position which is mounted on the optical axis of the projector. After the complete film is used it is wound up in reverse direction into the cartridge and the cartridge is then removed for storage.

Accordingly, a principal object of the invention is to provide new and improved film feeding means.

Another object of the invention is to provide new and improved means for self threading roll film feeding means.

Another object of the invention is to provide new and improved film cartridge means for strip film which is adapted to be inserted in a self threading feeding means.

These and other objects of the invention will be apparent from the following specification and drawings of which:

Figure 2:
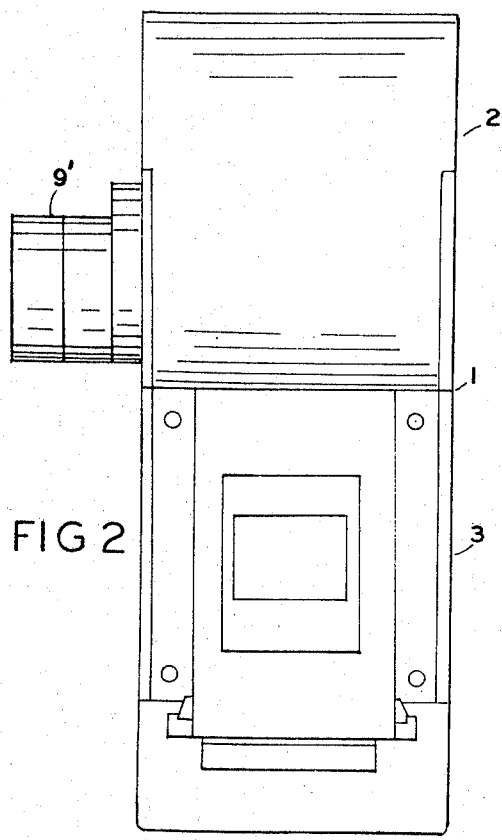
FIGURE 2 is a top view of the embodiment of FIGURE 1.

Referring to the figures, the invention generally comprises a body member 1 having a film feeding portion 2 and a film viewing portion 3. The film viewing portion 3 contains the conventional glass pressure plates and aperture mask and this portion is adapted to be inserted into the opening in a slide projector which normally received the slide changing apparatus.

The film feeding portion is hollow and contains a pivotally mounted film holding frame 4 which is pivotally mounted by the pin 5. The frame 4 extends around adjacent the inner surface of the cover 8 and is adapted to receive within it the roll of strip film F. The film roll is shown mounted in a cartridge 25. However the operation is the same with or without the cartridge. Cover 8 is pivotally mounted on the frame by pin 9 and is adapted to be secured by spring clip 19.

Figure 1:
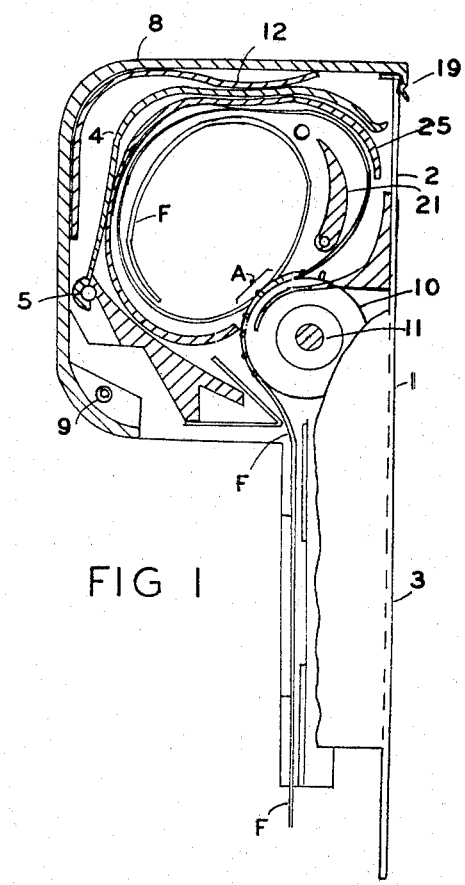
FIGURE 1 is a side view of an embodiment of the invention partly in section.
Figure 3:
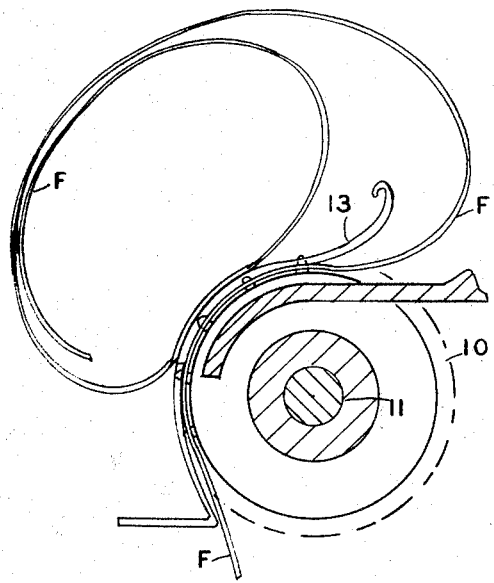
FIGURE 3 is a detail view of the embodiment of FIGURE 1.

Sprocket 10 is rotatably mounted in the body member by the shaft 11 which preferably has a conventional indexing knob 9' so that the film may be properly advanced. The frame 4 is spring loaded by the spring 12, on cover 8 so that the roll of film F bears against the sprocket 10. When the sprocket is rotated counter-clockwise in FIGURE 1, the film roll is rotated clockwise and the leading edge of the film is guided by means of strip guides 13 and a corresponding guide on the other side, into engagement with the sprocket 10 and into the viewing portion 3 where the film is viewed in the conventional manner.

The pivotally mounted spring loaded stripper 21 separates the leading edge from the film roll. The contact between the sprocket and the film occurs in the area indicated by the bracket A. As the sprocket is rotated counter-clockwise in FIGURE 1, it engages the sprocket holes in the area A and rotates the film roll clockwise, moving the leading edge under the guides 13 and into engagement with sprocket 10 and into the viewing position 3. The viewing position 3 has the conventional glass viewing plates for keeping the film flat in the viewing position. Note that the sprocket contacts and drives the film roll and the leading edge at the area A.

Sufficient leader is placed on the film so that after all the frames have been viewed there will be still some film left in the holder 4. After the film has been viewed the sprocket is then reversed and the film wound up in the holder 4.

In order to avoid taking the film into the hands and inserting the film in the film holder 4, it is desirable to keep the film in its own cartridge and insert the cartridge into the film folder 4.

Figure 4:
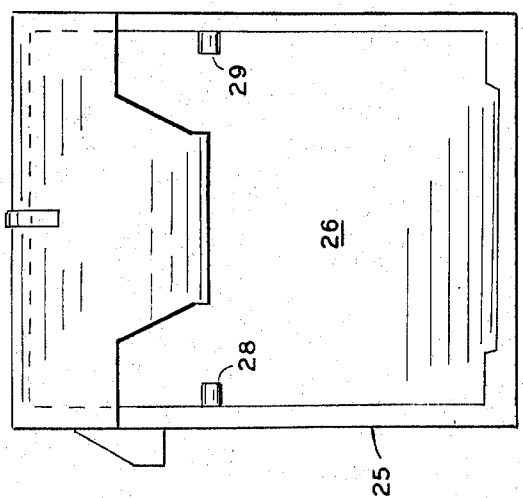
FIGURE 4 is a front view of a strip film cartridge.
Figure 5:
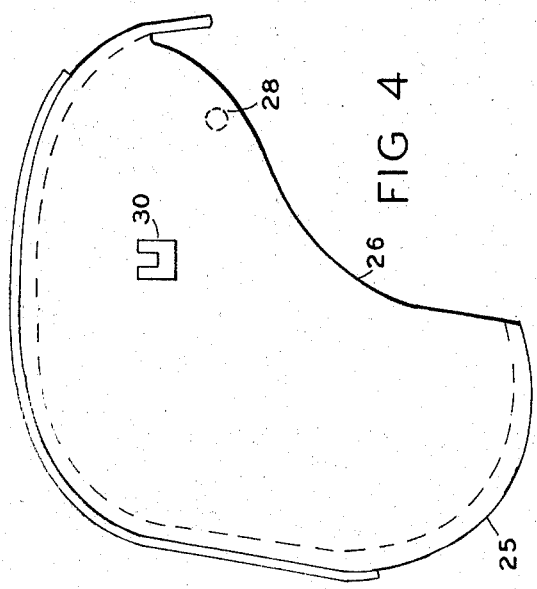
FIGURE 5 is a side view of a strip film cartridge.
Figure 6:
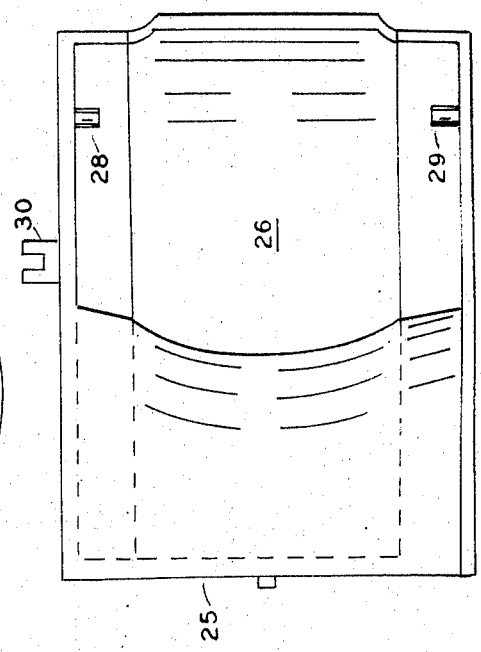
FIGURE 6 is a top view of a strip film cartridge.

A suitable strip film cartridge is shown in FIGURES 4, 5, and 6. This cartridge comprises a hollow member 25 which has a large aperture 26 which is used for inserting the film and for permitting contact between the sprocket 10 and the sprocket holes in the film in the cartridge 25. The cartridge preferably has two pins 28, 29 which are adapted to contain the roll inside the cartridge 25, and separate the leading edge of the film. Member 30 is a positioning rib.

When using the cartridge, the film is not touched by the hands at all. The cartridge is merely placed inside the film holder 4. The large aperture 26 is to permit the sprocket to engage the holes in the film and the operation is similar to that as previously discussed.

Many modifications may be made by those who desire to practice the invention without departing from the scope thereof which is defined by the following claims.

We claim:
1. Self-threading film strip adapter means comprising,
a body member having a film viewing portion and a hollow film feeding portion,
said film viewing portion being adapted to be inserted in a slide projector,
a sprocket rotatably mounted in said body member,
film holding means mounted in said film feeding portion of said body member and adapted to receive a film roll,
means to spring load said film holding means to press said film roll against said sprocket,
guide means adapted to guide said film past said sprocket and into said viewing portion,
said sprocket engaging said film roll to rotate said film roll so that the leading end of said film is pulled by said sprocket, and
stripper means mounted about said sprocket to separate said leading end from said roll.

2. Apparatus as in claim 1 incorporating a removable roll film cartridge comprising,
a hollow container adapted to fit into said film holder,
said container having a large aperture on one side thereof,
said aperture being adapted to permit said sprocket to come into contact with the sprocket holes on said film inside said container.

References Cited

UNITED STATES PATENTS

| | | | |
|---|---|---|---|
| 2,378,406 | 6/1945 | Harris | 95—31 |
| 2,632,361 | 3/1953 | Krows | 88—28 |
| 3,318,548 | 5/1967 | Palmer | 242—55.13 |
| 2,673,500 | 3/1954 | Cassidy et al. | 352—78 |

NORTON ANSHER, Primary Examiner
W. A. SIVERTSON, Assistant Examiner

U.S. Cl. X.R.

226—76, 118; 242—55, 71.1